C. R. SACHS.
WAGON SEAT SUPPORT.
APPLICATION FILED AUG. 6, 1913.

1,140,769.
Patented May 25, 1915.

Witnesses
M. S. Watson

Inventor
C. R. Sachs
By
Attorneys

UNITED STATES PATENT OFFICE.

CARL R. SACHS, OF FREMONT, OHIO.

WAGON-SEAT SUPPORT.

1,140,769.

Specification of Letters Patent.   Patented May 25, 1915.

Application filed August 6, 1913. Serial No. 783,398.

*To all whom it may concern:*

Be it known that I, CARL R. SACHS, a citizen of the United States, residing at Fremont, in the county of Sandusky, State of Ohio, have invented certain new and useful Improvements in Wagon-Seat Supports; and I do hereby declare the following to be a full, clear, and exact description of the invention, such as will enable others skilled in the art to which it appertains to make and use the same.

This invention relates to wagon seat supports.

The object of the invention resides in the provision of a simple and inexpensive wagon seat support which may be readily associated with spring wagon seats of the ordinary construction, and which will enable a wagon seat to be adjusted to the desired position on the sides of a wagon body, and which will in addition permit the wagon seat supported thereby to be readily swung forward out of the way when loading or unloading a wagon.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1:
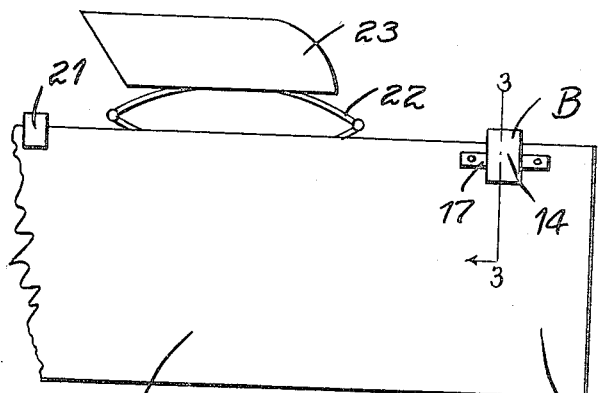
Figure 3:
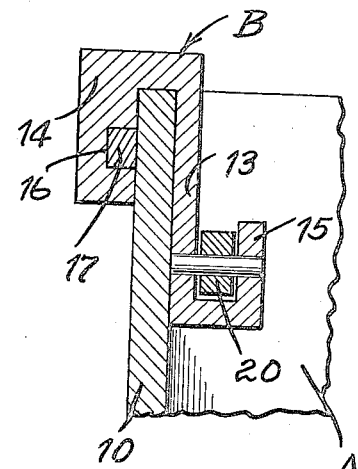
Figure 2:
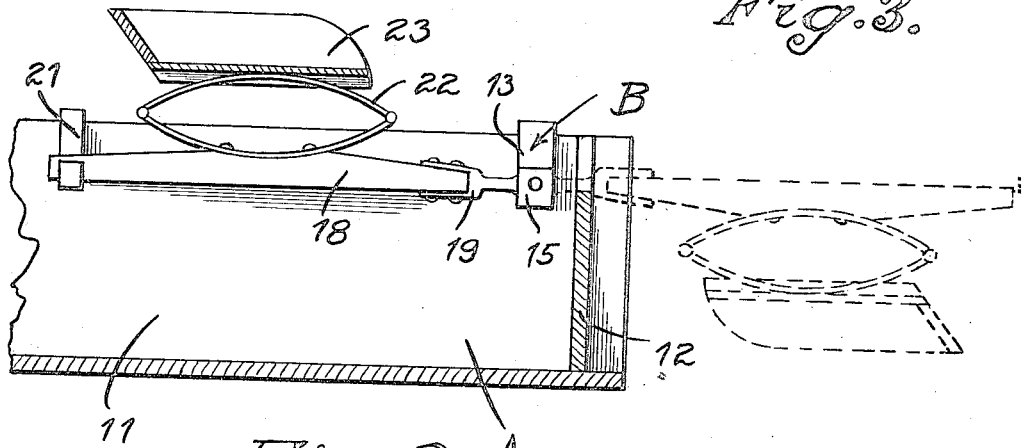
Figure 4:
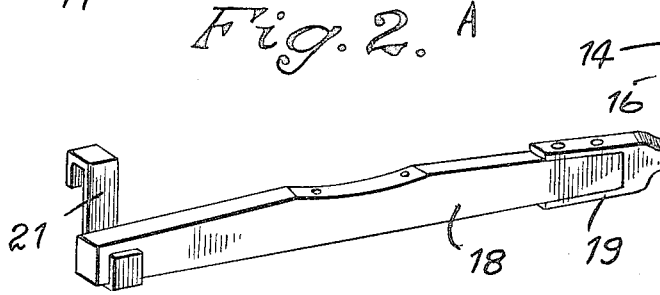

Figure 1 is a side elevation of a portion of a wagon having the improved seat support associated therewith; Fig. 2, is a longitudinal section of what is shown in Fig. 1 with the seat and support shown in full lines in normal position and in dotted lines in the position they would occupy when thrown forward in loading and unloading the wagon; Fig. 3, a section on the line 3—3 of Fig. 1, and Fig. 4, a detail perspective view of one of the spring supporting bars and the hook clip to which said bar is pivotally connected.

Referring to the drawings A indicates a wagon body which includes side members 10 and 11 and a front member or dash 12. Engaged over each of the side members 10 is a clip or bracket B and each of these brackets B comprises an intermediate portion 13 and oppositely disposed L-shaped terminals 14 and 15, the former being directly engaged over the upper edge of respective side members 10 and 11, the intermediate portion 13 of the bracket lying against the inner face of said side member. The arm of the L-shaped terminal 14 which extends contiguous with the side member is provided with a transverse slot 16 in which is slidably engaged a bar 17 mounted upon and running longitudinal of the side member and whereby the bracket B may be adjusted longitudinally of the side member and still be maintained in interlocking relation with the latter. The spring supporting bars are indicated at 18 and have their forward ends secured in forked brackets 19 respectively. These brackets 19 include a stem 20 which is pivotally mounted between the intermediate portion 13 of the bracket B and the arm of the L-shaped terminal 15 which runs parallel to the intermediate portion 13. Each of the bars 18 carries at its rear end a hook 21 which is adapted to engage over the adjacent side member to support the bar in proper position to sustain the seat. Each of the bars 18 has mounted thereon the usual elliptical spring 22 and these springs 22 directly support a seat 23 in the well known manner.

By this construction it will be apparent the seat when in normal position can be adjusted longitudinally of the side members 10 to a limited extent. It will be further apparent that when it is desired to load or unload the wagon the seat can be readily swung to the position shown in dotted lines in Fig. 2 where it will in no way interfere with the operation of loading and unloading.

What is claimed is:

In a structure of the class described the combination of a wagon body including side members, a longitudinal rib mounted on the outer side of each side member and extending longitudinally thereof, a bracket engaged with each side member, said bracket including an intermediate portion disposed against the inner side of the adjacent side member and oppositely disposed L-shaped terminals at the upper and lower ends of the intermediate portion respectively, the upper L-shaped terminal being engaged over the side member and having its arm which extends contiguous with the side member provided with a transverse groove in which the adjacent longitudinal rib is slidably engaged, a spring supporting bar having its forward end pivotally secured to the bracket, and means carried by the rear end of each spring supporting bar for engaging the adjacent wagon side to hold the bar in position longitudinally of the wagon side.

In testimony whereof, I affix my signature, in the presence of two witnesses.

CARL R. SACHS.

Witnesses:
WM. SACHS,
LULU B. SACHS.

Copies of this patent may be obtained for five cents each, by addressing the "Commissioner of Patents, Washington, D. C."